United States Patent
Krenkel

(10) Patent No.: US 11,302,042 B2
(45) Date of Patent: Apr. 12, 2022

(54) METHOD FOR CORRECTING NONLINEARITIES OF IMAGE DATA OF AT LEAST ONE RADIOGRAPH, AND COMPUTED TOMOGRAPHY DEVICE

(71) Applicant: Carl Zeiss Industrielle Messtechnik GmbH, Oberkochen (DE)

(72) Inventor: Martin Krenkel, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 16/458,050

(22) Filed: Jun. 29, 2019

(65) Prior Publication Data

US 2020/0005494 A1   Jan. 2, 2020

(30) Foreign Application Priority Data

Jun. 29, 2018  (DE) .................. 10 2018 210 802.1

(51) Int. Cl.
  *G06T 11/00* (2006.01)
  *G06T 5/00* (2006.01)
(52) U.S. Cl.
  CPC ........... *G06T 11/003* (2013.01); *G06T 5/001* (2013.01)
(58) Field of Classification Search
  CPC . G06T 11/003; G06T 5/001; G06T 2211/408; G06T 11/008; G06T 2207/10081; G06T 5/008
  See application file for complete search history.

(56) References Cited

U.S. PATENT DOCUMENTS

| | | | |
|---|---|---|---|
| 6,975,697 | B2 | 12/2005 | Kasperl et al. |
| 7,203,267 | B2 | 4/2007 | De Man et al. |
| 9,374,565 | B2 | 6/2016 | Gao et al. |
| 2006/0002504 | A1* | 1/2006 | De Man ................ G06T 11/006 378/4 |

(Continued)

FOREIGN PATENT DOCUMENTS

| | | |
|---|---|---|
| DE | 10202732 A1 | 8/2003 |
| DE | 102005018660 A1 | 11/2006 |

OTHER PUBLICATIONS

Google translation for DE 10 2005 018660 (Year: 2005).*

(Continued)

*Primary Examiner* — Qian Yang
(74) *Attorney, Agent, or Firm* — Falk Ewers; Ewers IP Law PLLC

(57) ABSTRACT

A method for correcting nonlinearities of image data of at least one radiograph and a computed tomography device are provided. The method includes obtaining image data of the at least one radiograph by irradiating an object with polychromatic invasive radiation and by detecting attenuated radiation that has passed through the object, utilizing a plurality of correction functions for correction purposes, said correction functions each being determined by the parameter value of at least one correction parameter, and applying an ascertainment method to ascertain the parameter value or the parameter values of the correction function used for correction purposes, said ascertainment method being determined by the parameter value of an ascertainment parameter or the parameter value sets of a plurality of ascertainment parameters.

9 Claims, 3 Drawing Sheets

(56) References Cited

U.S. PATENT DOCUMENTS

2016/0134852 A1* 5/2016 Gao ................. G06T 11/008
                                                    348/745

OTHER PUBLICATIONS

A.M. Kingston et al. "X-ray beam hardening correction by minimizing reprojection distance," Proceedings of SPIE 8506 (2012). 85061D-1 85061D-10., Oct. 17, 2012.
R. A. Ketcham et al. "Beam hardening correction for X-ray computed tomography of heterogeneous natural materials," Computers & Geosciences 67 (2014), pp. 49-61.
S. Abdurahman et al. "Calibration free Beam Hardening Correction using Grangeat-based Consistency Measure," Proceedings of the IEEE Nuclear Science Symposium, Medical Imaging Conference and Room-Temperature Semiconductor Detector Workshop, Strasbourg, 2016.

* cited by examiner

METHOD FOR CORRECTING NONLINEARITIES OF IMAGE DATA OF AT LEAST ONE RADIOGRAPH, AND COMPUTED TOMOGRAPHY DEVICE

CROSS REFERENCE TO RELATED APPLICATIONS

This application claims priority to German patent application DE 10 2018 210 802.1, filed Jun. 29, 2018, the entire content of which is incorporated herein by reference.

TECHNICAL FIELD

The disclosure relates to a method for correcting nonlinearities of image data of at least one radiograph, and a computed tomography device. In particular, the disclosure relates to a method for correcting nonlinearities of image data of at least one radiograph, which is or was obtained by irradiating an object with polychromatic invasive radiation and by detecting attenuated radiation that has passed through the object, wherein correction functions are used for correction purposes.

BACKGROUND

Beam hardening occurs in computed tomography with polychromatic x-ray sources in particular, since the low-energy part of the x-ray spectrum experiences a stronger attenuation during the passage through a test object than the higher energy part. This leads to nonlinearities in the attenuations captured by the x-ray detector.

There are a plurality of methods for correcting these nonlinearities. Correction functions are used, in particular, which ensure a linearization of captured attenuation values in the radiographs.

Some of these methods use a polynomial function as a correction function, by which polynomial function captured attenuation values are linearized.

If the reconstruction is written as a mathematical operation $v = \mathcal{R}^{-1}(a)$, where v denotes the reconstructed volume, $\mathcal{R}$ denotes the radon transform and a denotes the attenuations $a = -\log(I/I_0)$ of the intensities I detected by the x-ray detector in relation to the initial intensity of the non-attenuated x-ray radiation $I_0$, a reconstructed image or reconstructed volume of the test object, when using a polynomial function, is thus given by:

$$v_{corr} = \mathcal{R}^{-1}\left(\sum_i c_i a^i\right)$$

where $$\left(\sum_i c_i a^i\right)$$

is also denoted as a correction polynomial with the coefficients $c_i$.

In addition to the beam hardening, stray radiation also leads to further nonlinearities, especially in a computed tomography device, which can likewise be corrected by the correction function.

If the correction function is a correction polynomial, the coefficients $c_i$ of the correction polynomial are strongly dependent on the test object, particularly in the case where stray radiation occurs, and must, in general, be determined anew for each component class intended to be measured.

A known method for linearization by a correction polynomial is based on the empirical determination of the coefficients of the correction polynomial by minimizing the resultant deviations between the reconstructed image corrected by the correction polynomial and a predetermined target function for a known test object. Here, in principle, the method is not restricted to polynomial functions, but can also be carried out for different types of functions (e.g., spline functions or combinations of various functions).

By way of example, a method using correction polynomials is known from DE 10 2005 018 660 A1. Here, a threshold value for the material-dependent radiation attenuation is set for the purposes of determining the target function, said threshold value distinguishing air and material from one another, for example. By way of example, these are values that are expected for the material-dependent beam attenuation caused by the materials. However, a substantial disadvantage of the method is that the empirically determined coefficients of the correction polynomial generally depend on the chosen threshold value. This may lead to methods for determining the surface supplying different positions and thus having systematic errors in dimensional metrology as a consequence, which exhibit a user influence (by way of the selection of the threshold value).

U.S. Pat. No. 7,203,267 B2 describes a method in which computed tomography is used for metrology. Here, the method is designed specifically for a determination of surfaces.

SUMMARY

The disclosure is based on the technical problem of developing a method for correcting nonlinearities of image data of at least one radiograph and of developing an associated computed tomography device, in which nonlinearities can be corrected in an improved fashion.

The technical problem is solved by a method for correcting nonlinearities of image data of at least one radiograph and a computed tomography device as described herein.

A general concept of the disclosure includes carrying out a check during the determination of a correction function as to whether differences arise on account of a chosen parameter value or parameter value set of at least one predetermined ascertainment parameter (e.g., a threshold value for determining a target function), this being chosen by a user in particular, i.e., whether the measurement accuracy depends on the predetermined parameter value. To this end, it is not an individual predetermined parameter but a set of ascertainment parameters (e.g., a set of threshold values that yield a set of target functions), in particular a set of user-selectable ascertainment parameters, which is used when determining the correction function. Subsequently, the correction function is determined individually for each parameter, in particular for each user-selectable parameter, of the ascertainment parameters contained in the set. Once the correction functions are determined in each case, differences are subsequently determined between the radiographs corrected by the respective correction functions or between corrected reconstructed volumes of the test object, wherein each of the corrected radiographs or corrected reconstructed volumes of the test object corresponds to one of the parameters, in particular one of the user-selectable parameters, of the ascertainment parameters in the set. Alternatively, differences may also be determined by comparing the correction functions.

Then, the differences are minimized by varying one type of at least one of the correction functions and/or by varying the ascertainment method when determining the correction functions and when determining the respective correction functions anew. In particular, in this case, minimizing may mean that a measure for a difference between the individually corrected radiographs or corrected reconstructed volumes of the test object lies below a predetermined value. After the minimization, information is output. The information uniquely describes at least one of the correction functions obtained by the minimization as the correction function to be used for correction purposes.

The minimization leads to the radiographs corrected by the individual correction functions or the corrected reconstructed volumes of the test object converging toward one another such that, ultimately, information that merely describes one of the correction functions is sufficient for being able to carry out an optimized correction.

According to an aspect of the disclosure, an influence (in particular, an influence of a user) on the determination of the correction function can be reduced. Since a set of parameter values is generated on the basis of the parameter, in particular the user-selectable parameter, of the ascertainment parameter and since respectively one correction function is determined for each of the parameters present in the set, determining the correction functions becomes more independent of the parameter value of the parameter, in particular the user-selectable parameter. Since use is no longer only made of a single parameter value but the correction method instead is modified in such a way that a plurality of parameter values or parameter value sets, which differ from one another, are used, it is achieved that these parameter values or parameter sets have no bothersome influence on the reconstructed volume any more.

In particular, a method for correcting nonlinearities of image data of at least one radiograph is provided, which is or was obtained by irradiating an object with polychromatic invasive radiation and by detecting attenuated radiation that has passed through the object, wherein one of a plurality of correction functions is used for correction purposes, said correction functions each being determined by the parameter value of at least one correction parameter, wherein an ascertainment method is applied to ascertain the parameter value or the parameter values of the correction function used for correction purposes, said ascertainment method being determined by the parameter value of an ascertainment parameter or the parameter value sets of a plurality of ascertainment parameters. The method further includes:

a) generating or receiving a plurality of parameter values of the ascertainment parameter or a plurality of parameter value sets of the plurality of ascertainment parameters, b) determining one of the correction functions for each of the plurality of parameter values of the ascertainment parameter or for each of the plurality of parameter value sets of the plurality of ascertainment parameters, c) determining differences between reconstructed volumes of the test object corrected by the correction functions or determining the differences by comparing the correction functions, d) minimizing the differences by varying a type of at least one of the correction functions and/or by varying the ascertainment method and by repeating the determination of the correction functions according to measure b) and the determining of differences according to measure c), and e) outputting information which uniquely describes at least one of the correction functions obtained by measure d) as the correction function to be used for correction purposes.

Further, a computed tomography device with a polychromatic x-ray source includes a correction device, wherein the correction device is configured to correct nonlinearities of image data of at least one radiograph, which is or was obtained by irradiating an object with polychromatic invasive radiation and by detecting attenuated radiation that has passed through the object, wherein the correction device for the correction purposes one of a plurality of correction functions, said correction functions each being determined by the parameter value of at least one correction parameter, wherein an ascertainment device of the computed tomography device is configured to apply an ascertainment method to ascertain the parameter value or the parameter values of the correction function used for correction purposes, said ascertainment method being determined by the parameter value of an ascertainment parameter or the parameter value sets of a plurality of ascertainment parameters, and wherein the computed tomography device is configured to:

a) generate or receive a plurality of parameter values of the ascertainment parameter or a plurality of parameter value sets of the plurality of ascertainment parameters, b) determine one of the correction functions for each of the plurality of parameter values of the ascertainment parameter or for each of the plurality of parameter value sets of the plurality of ascertainment parameters, c) determine differences between reconstructed volumes of the test object corrected by the correction functions or determine the differences by comparing the correction functions, d) minimize the differences by varying a type of at least one of the correction functions and/or by varying the ascertainment method and by repeating the determination of the correction functions according to measure b) and the determination of differences according to measure c), and e) output information which uniquely describes at least one of the correction functions obtained by measure d) as the correction function to be used for correction purposes.

In particular, the ascertainment method is carried out once in measure b) for each of the plurality of parameter values of the ascertainment parameter or each of the plurality of parameter value sets of the plurality of ascertainment parameters in order to determine the associated correction function.

The correction function uniquely described by the output information is used in subsequent measurements, particularly in the computed tomography device, for correcting nonlinearities.

The data records used in measure b) for determining the correction function, i.e., the employed radiographs or the reconstructed volumes, can be both measured data records and simulated data records.

According to a first aspect of the disclosure, a measured data record, i.e., a reconstructed volume, based on captured radiographs, of a test object, is compared to an ideal volume. To this end, the ideal volume is generated using known a priori knowledge about the irradiated test object (object geometry, material distribution, material composition, and material density), in particular a segmentation of the reconstructed volume into different material regions.

According to the first aspect of the disclosure, a user can predetermine threshold values, dynamic threshold values or edge finding parameters, for example. These predetermine threshold values, dynamic threshold values or edge finding parameters serve to assign individual voxels to the object in the reconstructed volume on the basis of the greyscale values of the voxels.

According to a second aspect of the disclosure, a captured radiograph of an irradiated test object may also be compared to an ideal, simulated radiograph.

Further, measure b) may also be based on data records generated in a purely simulation-based fashion. To this end, an "ideal" radiograph without artefacts, i.e., for example, at only one energy of the radiation source and consequently without effects of beam hardening and/or without stray radiation effects, is calculated on the basis of known properties of the test object, such as a material distribution, a material composition, and a material density. Consequently, an artefact-free data record for a radiograph is determined on the basis of a known object geometry (e.g., in the form of CAD data or as a result of the preceding 3D reconstruction and surface determination). Additionally, a "real" radiograph, which also takes artefacts into account, is calculated, i.e., using a realistic spectrum of the radiation source and/or taking account of beam hardening effects and/or stray radiation. Then, the correction functions are determined in measure b) on the basis of the "ideal" and the "real" radiographs.

If simulation-based data records are used in carrying out measure b), a user can predetermine or modify a material composition, a material distribution or a material density, for example, in the model of the test object used for the simulation. By way of example, surfaces of the test object in the CAD model used for the simulation or in the three-dimensional reconstructed volume calculated therefrom can be displaced within the scope of measure d). Further, it is also possible to modify a spectrum of the radiation sources used for the simulation or an employed scattering model.

In one exemplary embodiment, provision is made for the correction functions to be polynomial functions, the coefficients of which are correction parameters that are determined by measure b). By way of example, a method for determining the coefficients for a correction polynomial is described in DE 10 2005 018 660 A1, which has already been mentioned above.

It is also possible, however, to use different types of correction functions, for example spline functions which have different embodiments section-by-section. Further, it is also possible to use different types of correction functions, for example a polynomial in a first section and spline functions in a second section, etc.

In an exemplary embodiment, provision is made for a degree of at least one of the polynomial functions to be modified in measure d) for the purposes of varying a type of at least one of the correction functions.

In one exemplary embodiment, provision is made for the ascertainment method to provide for the use of a target function, which describes a state of the test object as a function of a parameter value, embodied as a threshold value, of a material-dependent beam attenuation, wherein the correction functions for each of a plurality of different threshold values are determined in measure b). In the reconstructed volume, the threshold value is used to determine whether a voxel is assigned to the test object. By way of example, the voxel is assigned to the test object if a grey scale value of the voxel lies above the threshold value. Accordingly, there is no assignment to the object should the grey scale value of the voxel lie below the function. Then, this threshold value is varied as a parameter value of the ascertainment parameter for the individual target functions determined within the scope of measure a), for example by virtue of a threshold value chosen by a user being modified by +1-20%.

A target function takes account of a priori knowledge about the test object that is measured (or simulated). The target function describes the local distribution of material of the test object during the irradiation in a comparison image or a comparison volume. The spatial distribution corresponds to a target state, i.e., an expected state that is expected on account of previous knowledge about the test object. This previous knowledge relates to a radiation attenuation expected in the test object on account of the material distribution, for example. Then, such a target function is used as a prescription when determining the correction function within the scope of measure b).

The target functions of a set are similar but differ from one another in terms of at least one parameter. By way of example, the parameter is a threshold value for distinguishing material of the test object from its surroundings.

In an exemplary embodiment, at least one property of a transition region between two materials is modified in measure d) for the purposes of varying the target functions and hence for the purposes of varying the ascertainment method. By way of example, if the target function includes two regions, for example one with air and one with another material, there is a transition region between these two regions, at which the material adjoins the air. Then, it is possible to modify where this boundary is formed when varying the target functions. As a result of this, an influence of the exemplary embodiment of the transition region between the materials, specifically selected within the scope of a target function, can be reduced in relation to the determination of the parameter value or the parameter values for the correction function to be used for correction purposes.

In an exemplary embodiment, at least one of the target functions is filtered by a filter in measure d) for the purposes of obtaining an edge erosion in the transition region. By way of example, this may be a square 3×3 erosion filter. An erosion is achieved with the aid of a minimum filter in the case of such a 3×3 erosion filter. To this end, the picture values of the local neighborhood (a 3×3 neighborhood in this case) of the picture element are sorted. Then, the smallest picture value in the neighborhood is chosen as a resultant (new) value for the considered picture element. A consequence of such a filter is that the material boundary can be displaced. Hence, where the boundary lies varies when minimizing the differences through measure d). This allows the influence of the material boundary in the determination of the parameter value or the parameter values of the correction function to be used for correction purposes to be reduced.

If polynomial functions (correction polynomials) are chosen as correction functions, provision is made in a further exemplary embodiment for a degree of the correction polynomials to be modified for the purposes of varying the type of at least one of the correction functions in measure d). The degree of the employed correction polynomials can be both increased and reduced. This is advantageous in that a degree of the correction polynomials can be matched to a specifically present measurement situation.

In one exemplary embodiment, provision is made for a number of iterations in measure b), which are passed through when determining the correction functions, in particular in the case of coefficients of the correction polynomials, to be modified for the purposes of varying the ascertainment method. As a result, an improved determination of the correction functions can be achieved.

Alternatively, it is also possible to modify a method that is used for minimization purposes. Thus, the method for minimization purposes may be a least-squares minimization. Alternatively, it would also be possible to minimize not squared deviations but absolute deviations, for example.

Should use be made of target functions with associated threshold values, the ascertainment method can be applied iteratively in order to iteratively refine the target function in measure d). By way of example, a first result for a correction polynomial would already be present after a first run through of measures a) to d). The latter can be used to generate a corrected reconstructed volume and define a new target function on the basis of the corrected reconstructed volume with the threshold value originally chosen as an ascertainment parameter.

Likewise, provision can alternatively be made for the method to be carried out a plurality of times, wherein corrected radiographs form the new starting point of the next iteration in each case.

In one exemplary embodiment, provision is made for the differences between the volumes of the test object reconstructed by the correction functions to be determined in measure c) on the basis of respectively one surface of the test object determined from these volumes. Subsequently, dimensions of the test object, for example, can be determined on the basis of the surface produced. Here, the differences can be determined, for example, by comparing the surfaces in the reconstructed volumes, said surfaces respectively corresponding to the plurality of parameter values of the ascertainment parameter or the plurality of parameter sets of the plurality of ascertainment parameters. To this end, a suitable statistic for the differences can be determined, and by way of example, it is possible to determine an area of a region in which the surfaces overlap. Another option lies, for example, in the determination of a number of mesh points which are the same for the respective surfaces. Further, measurement deviations can be used to determine the differences, for example differences in lengths, diameters and/or positions in the reconstructed image or volume. The lengths, diameters and/or positions relate to the surfaces of the image test object, for example.

In a further exemplary embodiment, a plurality of the correction functions are polynomial functions and a check is carried out in measure c), when determining the differences by comparing the correction functions using an estimate, as to whether the correction polynomials defined by the respectively determined coefficients can be represented as a multiple of the respective other correction polynomial or polynomials with a predetermined accuracy. This is advantageous in that the three-dimensional volume need not be reconstructed or need not be reconstructed in respect of each of the correction functions. Instead, the influence on the differences can already be estimated on the basis of the determined correction functions. This can reduce a computational outlay and a duration when carrying out the method. It was found empirically that a corresponding difference is sufficiently small if such a representation is possible with sufficient accuracy, e.g., a predetermined accuracy. This estimate allows a further reduction in the computational outlay and of a duration when carrying out the method.

The individual exemplary embodiments of the computed tomography device in each case correspond to the exemplary embodiments of the method, wherein the ascertainment device is respectively configured to carry out the corresponding method step.

BRIEF DESCRIPTION OF THE DRAWINGS

The disclosure will now be described with reference to the drawings wherein.

DESCRIPTION OF EXEMPLARY EMBODIMENTS

Figure 1:
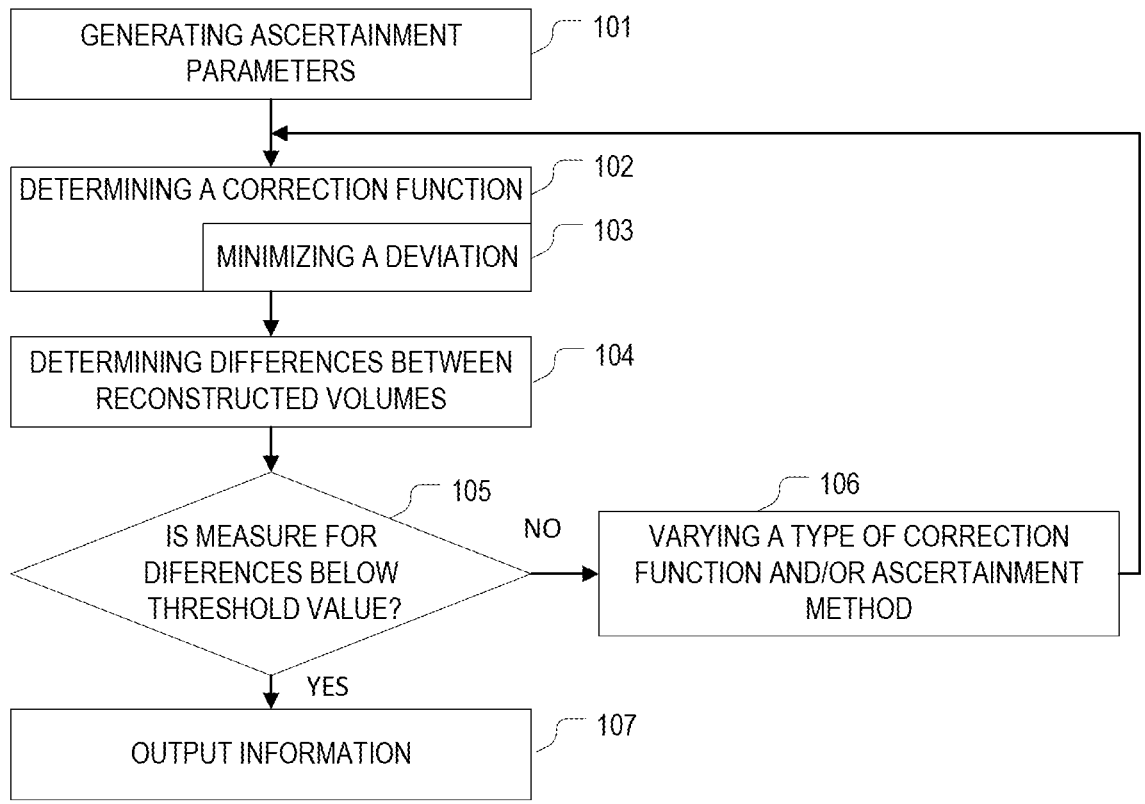
FIG. 1 shows a flowchart of a method for correcting nonlinearities of image data of at least one radiograph.

FIG. 1 shows a flowchart of a method for correcting nonlinearities of image data of at least one radiograph, which is or was obtained by irradiating an object with polychromatic invasive radiation and by detecting attenuated radiation that has passed through the object. A correction polynomial is used as a correction function to correct nonlinearities. A method for determining coefficients of the correction polynomial is integrated into the method. By way of example, such a method is described in DE 10 2005 018 660 A1.

In a first method step 101, a plurality of parameter values of the ascertainment parameter or a plurality of parameter value sets of the plurality of ascertainment parameters are generated within the scope of measure a). This is implemented by virtue of a set of target functions being generated for a test object. A target function describes the local distribution of material of the test object during the irradiation in a comparison image or a comparison volume. The spatial distribution corresponds to a target state, i.e., an expected state that is expected on account of previous knowledge about the test object. This previous knowledge relates to a radiation attenuation expected in the test object on account of the material distribution, the material composition and a material density, for example. By way of example, for the purposes of generating the target functions of the set, a value for a material-dependent beam attenuation is chosen to be different with otherwise unchanging properties.

A correction function is determined in the subsequent method step 102 by carrying out measure b) for each of the plurality of parameter values of the ascertainment parameter or for each of the plurality of parameter value sets of the plurality of ascertainment parameters. This is implemented by virtue of coefficients of the respective correction polynomial being determined in each case for each of the target functions generated in method step 101 while minimizing a deviation between a radiograph or corrected reconstructed volume of the test object, the radiograph being corrected by the correction polynomial, and the respective target function (method step 103). By way of example, the sum of the square deviations can be minimized for minimization purposes (least-square minimization).

The data records used within the scope of measure b) in method steps 102 and 103 for the purposes of determining the correction functions, i.e., the employed radiographs or the employed reconstructed volumes, can relate both to a measured data record and to a simulated data record.

In a first alternative, a measured data record, i.e., a reconstructed volume of a test object based on the captured radiographs, is compared to the target functions, which were produced by a priori knowledge about the irradiated test object, in particular a segmentation of the reconstructed volume in different material regions. For the purposes of determining the correction functions, in this case determining the coefficients of the correction polynomials, the (measured) reconstructed volume is made to correspond with the target functions by way of the correction functions.

In an alternative exemplary embodiment, provision can also be made in method step b) for a captured radiograph of an irradiated test object to be compared to an ideal, simulated radiograph within the scope of measure b) and the respective correction functions, which convert the captured radiograph into the simulated ideal radiograph, to be determined by way of the comparison.

Further, in method step 103, measure b) may also be based on data records generated in a purely simulation-based fashion. To this end, an "ideal" radiograph without artefacts, i.e., for example, at only one energy of the x-ray radiation source and consequently without effects of beam hardening and/or without stray radiation effects, is calculated on the basis of known properties of the test object, such as a material distribution, a material composition and a material density. Consequently, an artefact-free, ideal data record is determined on the basis of a known object geometry of the test object (e.g., in the form of CAD data or as a result of the preceding 3D reconstruction and surface determination). Additionally, a "real" radiograph, which also takes artefacts into account, is calculated, i.e., using a realistic spectrum of the x-ray radiation source and/or taking account of beam hardening effects and/or stray radiation. Then, the correction functions are determined in measure b) on the basis of the "ideal" and the "real" radiographs.

Subsequently, differences are determined between reconstructed volumes (or the corrected radiographs) of the test object corrected by the correction functions or are determined by comparison of the correction functions in the method step 104 within the scope of measure c). This is implemented by virtue of differences being determined between the corrected radiographs or corrected reconstructed volumes of the test object corresponding to the various target functions. The differences here should be understood to be a criterion in respect of how far measurement accuracy during the evaluation of the reconstruction is influenced by the choice of the type or the properties of the target functions. The determination is implemented by comparing the corrected reconstructed volumes of the test object while determining a suitable measure for the differences. Such a measure for the differences can be, for example, a difference of the individual image values or material voxels in the corrected radiographs or corrected reconstructed volumes of the test object in relation to one another.

Figure 3A:
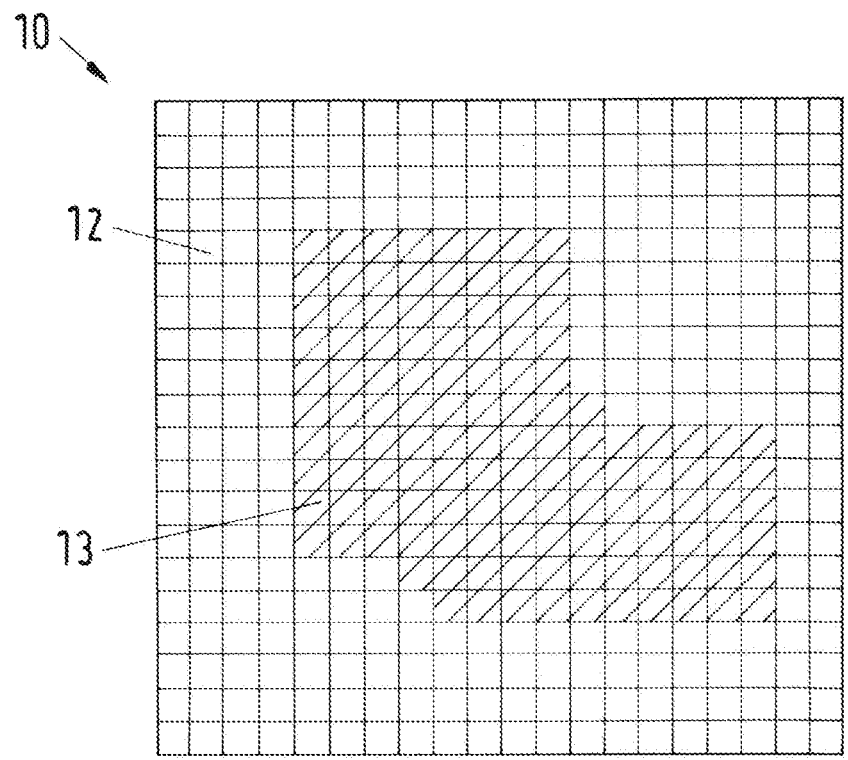
FIG. 3A shows a schematic illustration of a target function.
Figure 3B:
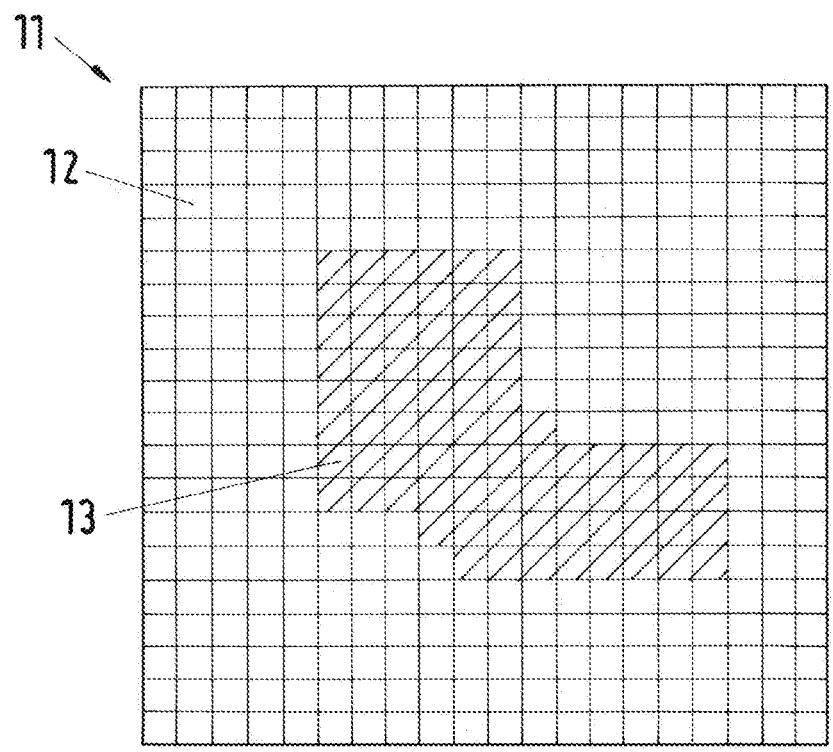
FIG. 3B shows a schematic illustration of the target function illustrated in FIG. 3A after being filtered by a square 3×3 erosion filter.

For the purposes of minimizing the differences, a check is carried out in method step 105 as to whether a measure for the differences drops below a predetermined threshold value. If this is not the case, a type of at least one of the correction functions and/or the ascertainment method is varied in method step 106 within the scope of measure d). By way of example, the target function can be modified in such a way in this case that a material boundary in a transition region between two materials or between a material and the air is displaced, for example by way of an edge erosion carried out by a filter. An example of such an edge erosion is illustrated in FIGS. 3A and 3B. Furthermore, a change in the degree of the correction polynomial or a change in the number of iterations carried out for the purposes of determining the coefficients are also possible, for example. After the variation, the method procedure is repeated from method step 102.

By contrast, if the check in method step 105 yields that the predetermined threshold value is undershot, information is output by measure e) in method step 107, said information uniquely describing at least one of the correction functions obtained by measure d) as the correction function to be used for correction purposes. This is implemented by virtue of the determined coefficients being output in method step 107 in such a way that these are available for a use of the correction polynomial within the scope of the reconstruction. Which sets of coefficients corresponding to the individual target functions is used is unimportant in this case since, according to the method, each set of coefficients substantially supplies the same results in the correction of the nonlinearity after the minimization.

Figure 2:
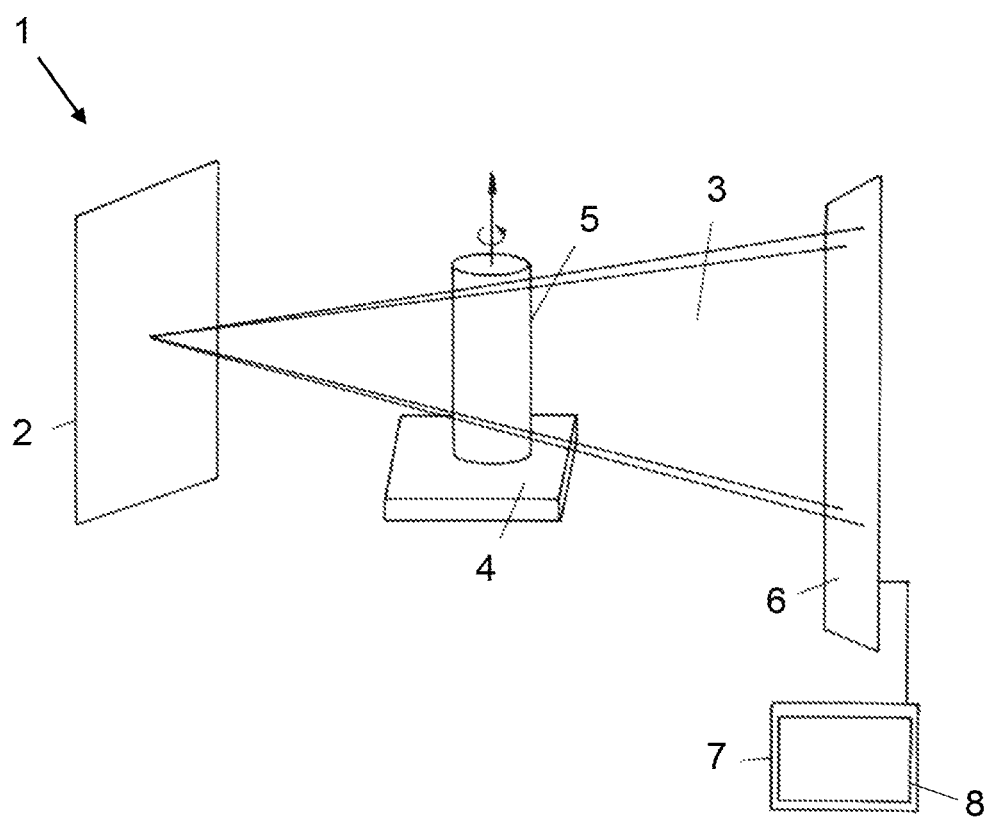
FIG. 2 shows a schematic illustration of a computed tomography device according to an exemplary embodiment of the disclosure.

FIG. 2 shows a schematic illustration of an exemplary embodiment of computed tomography device 1. The computed tomography device 1 includes an x-ray source 2 configured to generate x-ray radiation 3, a rotatable measuring spot 4, on which the test object 5 can be arranged and rotated, an x-ray detector 6 for capturing radiographs of the test object 5, and a correction device 7. The correction device 7 is configured to correct nonlinearities of image data of at least one radiograph, which is or was obtained by irradiating the test object 5 with polychromatic invasive radiation 3, in this case x-ray radiation, and by detecting attenuated radiation 3 that has passed through the test object 5. For correction purposes, the correction device 7 uses one of a plurality of correction functions, which are each determined by the parameter value of at least one correction parameter. An ascertainment device 8 of the computed tomography device 1 is configured to apply an ascertainment method to ascertain the parameter value or the parameter values of the correction function used for correction purposes, said ascertainment method being determined by the parameter value of an ascertainment parameter or the parameter value sets of a plurality of ascertainment parameters. The ascertainment device 8 of the computed tomography device 1 is configured to:

a) generate or receive a plurality of parameter values of the ascertainment parameter or a plurality of parameter value sets of the plurality of ascertainment parameters, b) determine one of the correction functions for each of the plurality of parameter values of the ascertainment parameter or for each of the plurality of parameter value sets of the plurality of ascertainment parameters, c) determine differences between reconstructed volumes of the test object 5 corrected by the correction functions or determine the differences by comparing the correction functions, d) minimize the differences by varying a type of at least one of the correction functions and/or by varying the ascertainment method and by repeating the determination of the correction functions according to measure b) and the determination of differences according to measure c), and e) output information which uniquely describes at least one of the correction functions obtained by measure d) as the correction function to be used for correction purposes.

The output information subsequently serves to correct nonlinearities of the image data of the captured radiographs in subsequent measurements by one of the correction functions such that corrected radiographs or corrected reconstructed volumes can be generated therefrom. To this end, the output information is transmitted to the correction device 7 and accordingly taken into account by the latter during the correction in subsequent measurements.

In particular, a polynomial function (correction polynomial) can be provided as a correction function. Then, the output information includes coefficients of the correction polynomial.

FIGS. 3A and 3B show schematic target functions 10 and 11 to illustrate a variation carried out within the scope of the method. Here, FIG. 3A shows a two-dimensional target function 10, which merely represents two substances, for example air in the outer region 12 and a solid material in the center 13, for individual mesh points. This target function 10 is filtered by a square 3×3 erosion filter. The local 3×3 neighborhood is considered in each picture element (a 3×3×3 neighborhood is accordingly considered in a volume). The minimum value of the picture elements in the neighborhood defines the new value for the considered picture element. The filtered target function 11 is illustrated in FIG. 3B. After filtering, the region in the center 13 has become significantly smaller, and by contrast, the outer region 12 has increased in terms of area (or volume). Processing by a filter, in particular, can reduce the dependence of the determined coefficients of properties of such a transition region between different materials. As a result, the correction of the nonlinearities can be improved.

It is understood that the foregoing description is that of the exemplary embodiments of the disclosure and that various changes and modifications may be made thereto without departing from the spirit and scope of the disclosure as defined in the appended claims.

LIST OF REFERENCE NUMERALS

1 Computed tomography device
2 X-ray source
3 X-ray radiation
4 Measuring spot
5 Test object
6 X-ray detector
7 Correction device
8 Ascertainment device
10 Target function
11 Target function
12 Outer region
13 Centre
101-107 Method steps

What is claimed is:

1. A method for correcting nonlinearities of image data of at least one radiograph, the method comprising:
   utilizing one of a plurality of correction functions for correction purposes, each of the correction functions being determined by a parameter value of at least one correction parameter;
   applying an ascertainment method to determine a parameter value or parameter values of a correction function used for the correction purposes, said ascertainment method being determined by the parameter value of an ascertainment parameter or the parameter value sets of a plurality of ascertainment parameters;
   a) generating or receiving a plurality of parameter values of the ascertainment parameter or a plurality of parameter value sets of the plurality of ascertainment parameters;
   b) determining the plurality of correction functions by determining one of the plurality of correction functions for each of the plurality of parameter values of the ascertainment parameter or for each of the plurality of parameter value sets of the plurality of ascertainment parameters;
   c) determining at least one of (i) differences between reconstructed volumes of a test object each corrected by individual functions of the plurality of correction functions, (ii) the differences between radiographs each corrected by the individual functions of the plurality of correction functions, and (iii) the differences by comparing the correction functions;
   d) minimizing the differences by varying a type of at least one of the plurality of correction functions and/or by varying the ascertainment method and by repeating the determining of the correction function according to step b) and the determining of the differences according to step c); and
   e) outputting information which uniquely describes at least one of the plurality of correction functions obtained by step d) as the correction function to be used for correction purposes.

2. The method according to claim 1, wherein:
the correction functions are polynomial functions, and
coefficients of the correction functions are correction parameters determined in step b).

3. The method according to claim 2, further comprising:
modifying a degree of at least one of the polynomial functions in step d) for varying the type of at least one of the correction functions.

4. The method according to claim 1, further comprising:
utilizing a target function in the ascertainment method, which describes a state of the test object as a function of the parameter value, embodied as a threshold value, of a material-dependent beam attenuation, wherein the correction functions for each of a plurality of different threshold values are determined in step b).

5. The method according to claim 4, further comprising:
modifying at least one property of a transition region between two materials in step d) to vary target functions and the ascertainment method.

6. The method according to claim 5, further comprising:
filtering at least one of the target functions by a filter in step d) to obtain an edge erosion in the transition region.

7. The method according to claim 4, further comprising:
determining the differences between the volumes of the test object reconstructed by the correction functions in step c) based on respectively one surface of the test object determined from the volumes.

8. The method according to claim 1, wherein a plurality of the correction functions are polynomial functions, and the method further comprises:
carrying out a check in step c) when determining the differences by comparing the correction functions based on an estimate, as to whether correction polynomials defined by the respectively determined coefficients can be represented as a multiple of the respective other correction polynomial or polynomials with a predetermined accuracy.

9. A computed tomography device having a polychromatic x-ray source, the computed tomography device comprising:
a processor configured to:
correct nonlinearities of image data of at least one radiograph, the image data being obtained by irradiating an object with polychromatic invasive radiation and by detecting attenuated radiation that has passed through the object, wherein a correction device utilizes one of a plurality of correction functions for correction purposes, said correction functions each being determined by a parameter value of at least one correction parameter; and
apply an ascertainment method to determine a parameter value or parameter values of a correction function utilized for correction purposes, said ascertainment method being determined by the parameter value of an ascertainment parameter or parameter value sets of a plurality of ascertainment parameters, wherein the computed tomography device is configured to:

a) generate or receive a plurality of parameter values of the ascertainment parameter or a plurality of parameter value sets of the plurality of ascertainment parameters;

b) determine the plurality of correction functions by determining one of the plurality of correction functions for each of the plurality of parameter values of the ascertainment parameter or for each of the plurality of parameter value sets of the plurality of ascertainment parameters;

c) determine at least one of (i) differences between reconstructed volumes of a test object each corrected by individual functions of the plurality of correction functions, (ii) the differences between radiographs each corrected by the individual functions of the plurality of correction functions, and (iii) the differences by comparing the correction functions;

d) minimize the differences by varying a type of at least one of the plurality of correction functions and/or by varying the ascertainment method and by repeating a determination of the correction functions according to b) and the determination of differences according to c), and e) output information which uniquely describes at least one of the plurality of correction functions obtained by d) as the correction function to be used for correction purposes.

* * * * *